US011926005B2

(12) United States Patent
Haight (10) Patent No.: US 11,926,005 B2
(45) Date of Patent: Mar. 12, 2024

(54) MILL BIT FOR THE MANUFACTURE OF A WIND TURBINE BLADE AND METHOD OF FORMING SAME

(71) Applicant: Vestas Wind Systems A/S, Aarhus N. (DK)

(72) Inventor: Jeremy Haight, Arvada, CO (US)

(73) Assignee: Vestas Wind Systems A/S, Aarhus N. (DK)

(*) Notice: Subject to any disclaimer, the term of this patent is extended or adjusted under 35 U.S.C. 154(b) by 1075 days.

(21) Appl. No.: 16/636,110

(22) PCT Filed: Aug. 2, 2018

(86) PCT No.: PCT/DK2018/050189
§ 371 (c)(1),
(2) Date: Feb. 3, 2020

(87) PCT Pub. No.: WO2019/024966
PCT Pub. Date: Feb. 7, 2019

(65) Prior Publication Data
US 2020/0246923 A1 Aug. 6, 2020

Related U.S. Application Data

(60) Provisional application No. 62/540,610, filed on Aug. 3, 2017.

(30) Foreign Application Priority Data

Aug. 8, 2017 (DK) .......................... PA 2017 70607

(51) Int. Cl.
*B23P 15/02* (2006.01)
*B23C 5/04* (2006.01)
*B23C 5/18* (2006.01)

(52) U.S. Cl.
CPC ............... *B23P 15/02* (2013.01); *B23C 5/04* (2013.01); *B23C 5/18* (2013.01); *B23C 2230/045* (2013.01)

(58) Field of Classification Search
CPC ............ B23B 2270/30; B23B 2270/62; B23C 2230/045; B23C 2230/08; B23C 5/04;
(Continued)

(56) References Cited

U.S. PATENT DOCUMENTS 716,557 A * 12/1902 Klingensmith ........ B27G 15/00
408/214
3,120,286 A * 2/1964 Bridwell ................. E21B 10/54
175/425
(Continued)

FOREIGN PATENT DOCUMENTS

CN 2434082 Y 6/2001
CN 1615198 A 5/2005
(Continued)

OTHER PUBLICATIONS

European Patent Office, examination report issued in corresponding EP Application No. 18755124.7, dated Sep. 22, 2023.
(Continued)

*Primary Examiner* — Sara Addisu (57) ABSTRACT

A mill bit for the manufacture of a wind turbine blade includes an elongate based body having a proximal end, a distal end, an outer surface, and an internal bore that defines an inner surface, one or more flutes formed on the outer surface that defines one or more teeth, and an abrasive coating on at least a portion of the outer surface, wherein the one or more flutes are free of the abrasive coating. An abrasive coating may be selectively applied on the inner surface to provide flutes on the inner surface. Additionally, porting bores may be provided through the mill bit to fluidly
(Continued)

connect the outside and inside of the mill bit. A method of making a mill bit is also described.

14 Claims, 5 Drawing Sheets

(58) Field of Classification Search
CPC ............... B23C 5/10; B23C 2210/241; B23C 2210/242; B23C 2210/40; B23C 5/18; B23C 2215/04; B23Q 11/0046; B23P 15/02
See application file for complete search history.

(56) References Cited

U.S. PATENT DOCUMENTS

| | | | |
|---|---|---|---|
| 3,229,427 A | 1/1966 | Staplehurst | |
| 4,165,790 A * | 8/1979 | Emmerich | E21B 10/38 175/420.1 |
| 4,589,823 A * | 5/1986 | Koffel | F01D 5/20 416/241 B |
| 5,020,394 A | 6/1991 | Nakamura et al. | |
| 5,069,584 A * | 12/1991 | Obermeier | B24D 99/00 125/20 |
| 5,316,416 A * | 5/1994 | Kim | B24D 7/18 408/145 |
| 5,725,333 A * | 3/1998 | Abe | B23C 5/1081 407/54 |
| 5,807,032 A * | 9/1998 | Abe | B23C 5/1081 407/54 |
| 6,196,908 B1 * | 3/2001 | Adams | B24D 7/18 451/259 |
| 7,326,009 B2 * | 2/2008 | Lindblom | B23B 51/00 408/229 |
| 8,430,608 B2 * | 4/2013 | Sugano | B23B 51/02 408/67 |
| 8,590,646 B2 * | 11/2013 | Lambert | E21B 10/46 175/425 |
| 8,622,661 B2 * | 1/2014 | Inamasu | B23Q 11/0046 409/137 |
| 9,308,611 B2 * | 4/2016 | Hideta | B23Q 11/0046 |
| 9,434,009 B2 * | 9/2016 | Kakimoto | B23B 51/009 |
| 9,937,599 B1 * | 4/2018 | Holleman | B23Q 11/0046 |
| 2004/0087256 A1 * | 5/2004 | Schwartz | B24D 7/18 451/541 |
| 2004/0258489 A1 * | 12/2004 | Volokh | B23C 5/10 407/53 |
| 2006/0035566 A1 * | 2/2006 | Grady | B24D 18/0018 451/28 |
| 2007/0297864 A1 * | 12/2007 | de Boer | B23C 5/10 407/54 |
| 2009/0000441 A1 * | 1/2009 | Hasebe | B23C 5/1009 409/137 |
| 2009/0274525 A1 * | 11/2009 | Omori | B23C 5/20 407/119 |
| 2010/0260568 A1 * | 10/2010 | Osawa | B23G 5/18 409/74 |
| 2012/0061146 A1 | 3/2012 | Pearce et al. | |
| 2013/0017026 A1 * | 1/2013 | Hasegawa | C23C 28/044 407/115 |
| 2015/0158095 A1 * | 6/2015 | Strasmann | B23C 5/10 407/54 |
| 2016/0082523 A1 | 3/2016 | Thomsen | |
| 2018/0281126 A1 * | 10/2018 | Glimpel | B23P 9/02 |
| 2018/0292038 A1 * | 10/2018 | Heersema | B23B 51/044 |
| 2019/0358718 A1 * | 11/2019 | Kuroda | B23C 5/10 |

FOREIGN PATENT DOCUMENTS

| | | | |
|---|---|---|---|
| CN | 201030448 | 3/2008 | |
| CN | 201205739 | 3/2009 | |
| CN | 201493517 | 6/2010 | |
| CN | 103097064 A | 5/2013 | |
| CN | 203696057 | 7/2014 | |
| CN | 104264068 A | 1/2015 | |
| CN | 104275513 A | 1/2015 | |
| DE | 3143847 A1 | 5/1983 | |
| DE | 10337832 | 3/2005 | |
| DE | 202014007558 U1 | 11/2014 | |
| DE | 102020109739 A1 * | 10/2021 | ............... B23C 5/04 |
| EP | 2623771 A1 | 8/2013 | |
| EP | 3006146 A2 | 4/2016 | |
| GB | 2481295 A | 12/2011 | |
| GB | 2501001 A | 10/2013 | |
| JP | 2002018627 A * | 1/2002 | ............... B23C 5/04 |
| JP | 200939811 A | 2/2009 | |
| WO | 8703036 A1 | 5/1987 | |
| WO | 0249801 A1 | 6/2002 | |
| WO | WO-2008132740 A1 * | 11/2008 | ............. B23C 5/006 |
| WO | WO-2010050388 A1 * | 5/2010 | ............. B23B 51/02 |
| WO | 2015018842 A1 | 2/2015 | |
| WO | WO-2018077495 A1 * | 5/2018 | ......... B23B 51/0486 |
| WO | WO-2018131166 A1 * | 7/2018 | ............... B22F 7/06 |

OTHER PUBLICATIONS

China National Intellectual Property Administration, First Notification of Office Action in CN Application No. 201880058576.X, dated Sep. 1, 2020.
China National Intellectual Property Administration, 2nd Notification of Office Action in CN Application No. 201880058576.X, dated Apr. 20, 2021.
Danish Patent and Trademark Office, Search and Examination Report in PA 2017 70607, dated Jan. 24, 2018.
European Patent Office, International Search Report and Written Opinion in PCT Application No. PCT/DK2018/050189, dated Oct. 26, 2018.

* cited by examiner

FIG. 7

MILL BIT FOR THE MANUFACTURE OF A WIND TURBINE BLADE AND METHOD OF FORMING SAME

TECHNICAL FIELD

The invention relates generally to wind turbines, and more particularly to an improved mill bit used in the manufacture of a wind turbine rotor blade, and a method of forming and recycling the improved mill bit.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a central hub and a plurality of blades coupled to the hub and extending outwardly therefrom. The rotor is supported on a shaft extending from the nacelle, which shaft is either directly or indirectly operatively coupled with a generator which is housed inside the nacelle. Consequently, as wind forces the blades to rotate, electrical energy is produced by the generator.

In recent years, wind power has become a more attractive alternative energy source and the number of wind turbines, wind farms, etc. has significantly increased, both on land and off-shore. Additionally, the size of wind turbines has also significantly increased, with modern wind turbine blades extending between 50 to 80 meters in length, and is expected to further increase in the future. As blade length continues to increase, the stresses experienced at the joint between the wind turbine blade to the rotor hub also increases. Conventional joints between wind turbine rotor blades and the rotor hub include threaded stud bolts coupled to and extending from the root end of the wind turbine blade, which are in turn coupled to a pitch bearing associated with the rotor hub. Wind turbine blades are typically made from one or more composite materials formed from fibrous material and resin. Such materials generally do not have the structural integrity to provide a secure fixing mechanism into which the threaded stud bolts may be directly inserted. A hole or bore, for example, may be tapped into the composite material at the root end of the rotor blade to provide a complementing thread upon which the stud bolt may achieve a connection. However, the composite material has insufficient shear strength to transfer the loads between the blades and hub via the stud bolts and deterioration of the composite material at the interface would readily occur.

For this reason, it is generally known to utilize internally threaded metal inserts at the interface between the threaded stud bolts and the composite material at the root end of the wind turbine blade. In this regard, tapped bores are typically formed along the circumference of the root end of the wind turbine blade. The metal inserts are then positioned within the tapped bores and adhesively bonded therein to essentially embed the metal inserts within the composite material of the rotor blade. The stud bolts are then threadably engaged with the metal inserts. The forces acting between the rotor blade and rotor hub act through the stud bolts, and thus are transferred via the metal inserts, which operate to more uniformly distribute the forces over the interface area with the softer composite material. The force distribution characteristics provided by the metal inserts in turn provide a connection joint with a structural integrity sufficient to provide a secure connection between the rotor hub and rotor blade during use.

The bores formed along the circumference of the root end of the wind turbine blade are typically formed through a milling process using a milling machine and one or more mill bits operatively coupled to the milling machine for rotating the mill bit during use. One of the final mill bits used in the formation of the bores is referred to as a finishing mill bit. Conventional finishing mill bits have a hollow construction and include a fluted exterior surface and an interior surface, both of which are completely covered by an abrasive particle coating, such as an industrial diamond coating applied through an adhesive wash process, for example. A distal end of the finishing mill bit is configured to be removably coupled to a castellated milling tip, and a proximal end of the mill bit is configured to be coupled to the milling machine. During operation of the finishing mill bit, the abrasive coating on the exterior and interior of the mill bit produces a fine powder of fiber and resin particles from the composite material from which the wind turbine blade is formed. The interior of the mill bit is operatively coupled to a vacuum system for pulling a vacuum along the interior of the mill bit. In this way, air and powder (e.g., fine fiber and resin chips) flows downwardly along the exterior of the mill bit via the flutes, through the openings in the castellated tip, upwardly along the interior of the mill bit, and out of the mill bit adjacent its proximal end. The finishing mill bit not only conforms the bore to its final shape, but also activates the surface of the bore so as to provide an improved bonding interface with the metal insert that is received and secured in the bore through a suitable adhesive.

While such finishing mill bits are successful for their intended purpose, there remain a few drawbacks with existing mill bit designs. In this regard, conventional finishing mill bits have to be replaced fairly regularly due to excessive wear and clogging. In this regard, it is believed that current finishing mill bits become excessively hot during operation such that the resin particles in the composite powder produced from the milling process essentially reactivates, causing the powder to stick to the mill bit. This, in turn, causes a reduction in air flow over and through the mill bit, such that the temperature further increases and more of the resin reactivates to increase the stickiness of the powder. Through this process, the mill bit eventually becomes clogged and inoperable for removing the milled composite material from the bore. When this occurs, the mill bit must be replaced. Current finishing mill bits have an operating life of between about 250 and about 280 bores. Frequent replacement of the finishing mill bit increases the overall costs to manufacture wind turbine blades.

Accordingly, there is a need for an improved finishing mill bit for forming the bores in the root end of wind turbine blades that overcomes the drawbacks in conventional mill bit designs and extends the operating life of the mill bit in order to reduce the manufacturing costs of wind turbine blades.

SUMMARY

A mill bit for the manufacture of a wind turbine blade includes an elongate base body having a proximal end, a distal end, an outer surface, and an internal bore that defines an inner surface; one or more flutes formed on the outer surface that defines one or more teeth; and an abrasive coating on at least a portion of the outer surface, wherein the one or more flutes are free of the abrasive coating. The one or more flutes on the outer surface may have a surface roughness less than or equal to about $R_a=8$ microinches (0.2 micrometers). The abrasive coating may include industrial diamonds or cubic boron nitride (CBN). Additionally, in one embodiment, the grain size of the abrasive coating may be about D501 or greater. Furthermore, the one or more flutes on the outer surface may be helical flutes.

In one embodiment the inner surface of the mill bit may also include an abrasive coating. The abrasive coating may be selectively applied to the inner surface so as to define one or more void strips that are free of the abrasive coating, thereby defining one or more flutes on the inner surface. An interface between the abrasive coating and the one or more void strips defines a cutting edge that removes material through a cutting action rather than a grinding action. The one or more void strips may be finished so as to have a surface roughness less than or equal to about $R_a=8$ microinches (0.2 micrometers). In one embodiment the one or more void strips define one or more linear flutes on the inner surface of the mill bit.

In a further aspect, the mill bit may include one or more porting bores extending through a wall of the base body to fluidly connect an external environment with the internal bore. In an exemplary embodiment there are a plurality of porting bores that are longitudinally and/or circumferentially spaced from one another in, for example, a regular or irregular pattern. By way of example, the plurality of bores may be arranged as a first ring of circumferentially spaced porting bores, a second ring of circumferentially spaced porting bores, and a third ring of circumferentially spaced porting bores, wherein the first, second, and third rings are longitudinally spaced from one another. The number of porting bores in each of the first, second, and third rings may correspond to the number of flutes on the outer surface of the mill bit (e.g., four). Each of the one or more porting bores may be open to a flute on the outer surface of the mill bit in order to enhance airflow. Alternatively or additionally, the one or more porting bores may be open to a void strip on the inner surface of the mill bit.

In another embodiment a method of making a mill bit for the manufacture of a wind turbine blade includes providing an elongate base body having a proximal end, a distal end, an outer surface, an internal bore that defines an inner surface, and one or more flutes formed on the outer surface that defines one or more teeth; and selectively applying an abrasive coating on the outer surface such that the one or more teeth include the abrasive coating and the one or more flutes are free of the abrasive coating.

The method may additionally include finishing the one or more flutes on the outer surface to have a surface roughness less than or equal to about $R_a=8$ microinches (0.2 micrometers). Moreover, the method may include applying an abrasive coating on the inner surface. In one embodiment, this may include selectively applying the abrasive coating to the inner surface to define one or more void strips that are free of the abrasive coating, thereby defining one or more flutes on the inner surface. The one or more void strips on the inner surface may further be finished so as to have a surface roughness less than or equal to about $R_a=8$ microinches (0.2 micrometers).

In yet a further aspect, the method further includes, forming one or more porting bores through a wall of the base body to fluidly connect an external environment with the internal bore. This forming step may include, for example, forming the porting bores such that each porting bore is open to a flute on the outer surface of the mill bit. This forming step may additionally include forming the porting bores such that each porting bore is open to a void strip on the inner surface of the mill bit.

In a further embodiment, a method of recycling a mill bit used in the manufacture of wind turbine blades includes providing a worn mill bit including an elongate base body having a proximal end, a distal end, an outer surface, an internal bore that defines an inner surface, one or more flutes formed on the outer surface that defines one or more teeth, and an abrasive coating on the outer surface; removing the abrasive coating on the outer surface; and reapplying another coating to selective portions of the outer surface. In one embodiment, reapplying another abrasive coating further includes selectively applying an abrasive coating on the outer surface such that the one or more teeth include the abrasive coating and the one or more flutes are free of the abrasive coating.

In yet another embodiment, a mill bit for the manufacture of a wind turbine blade includes an elongate base body having a proximal end, a distal end, an outer surface, and an internal bore that defines an inner surface; one or more flutes formed on the outer surface that defines one or more teeth; an abrasive coating on at least a portion of the outer surface; and one or more porting bores extending through a wall of the base body to fluidly connect an external environment with the internal bore. In an exemplary embodiment there are a plurality of porting bores that are longitudinally and/or circumferentially spaced from one another in, for example, a regular or irregular pattern. The plurality of porting bores may be longitudinally spaced from one another by a substantially equal amount. By way of example, the plurality of bores may be arranged as a first ring of circumferentially spaced porting bores, a second ring of circumferentially spaced porting bores, and a third ring of circumferentially spaced porting bores, wherein the first, second, and third rings are longitudinally spaced from one another. The number of porting bores in each of the first, second, and third rings may correspond to the number of flutes on the outer surface of the mill bit (e.g., four). Each of the one or more porting bores may be open to a flute on the outer surface of the mill bit in order to enhance airflow. Moreover, the one or more porting bores may be open to a void strip on the inner surface of the mill bit.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
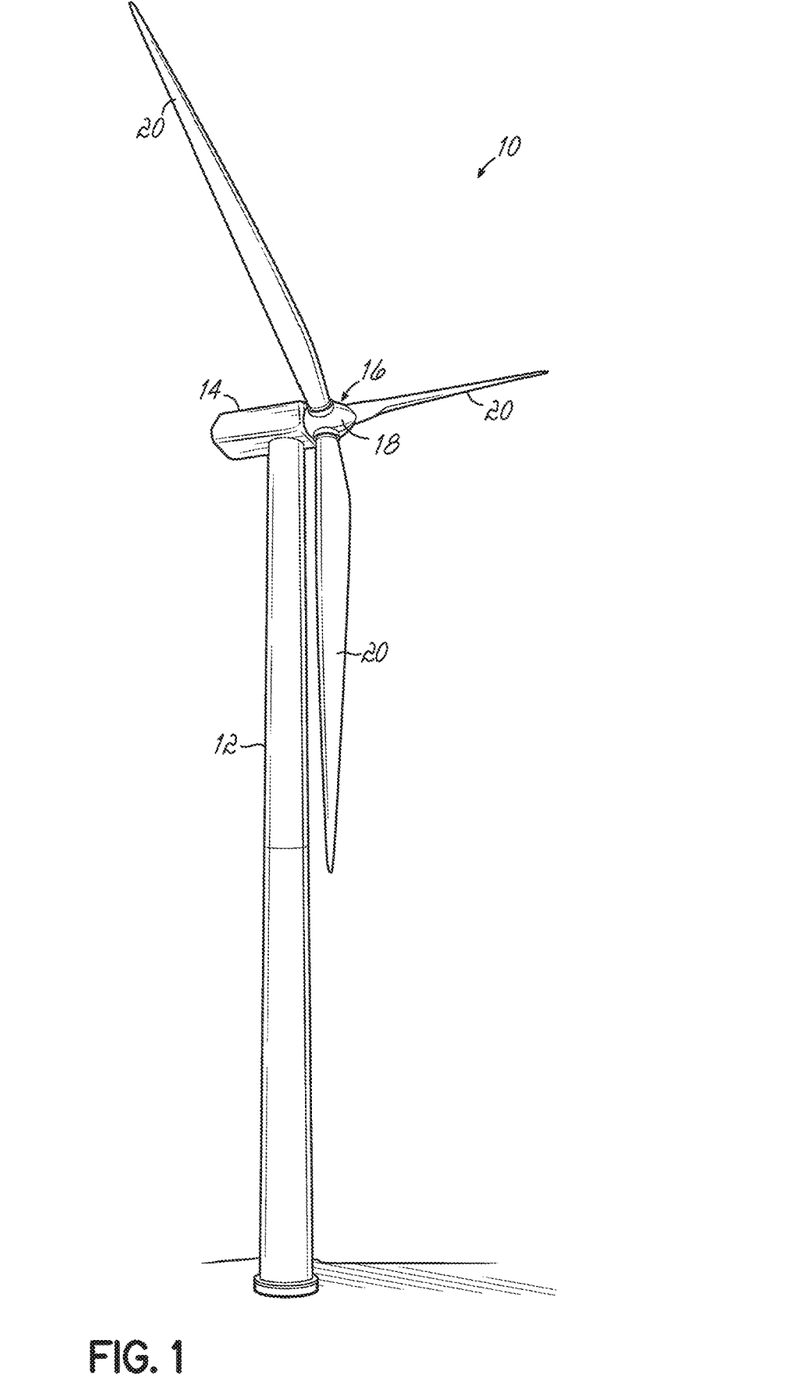
FIG. 1 is a perspective view of a wind turbine in which embodiments of the invention may be used for manufacturing.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of wind turbine 10 includes a central hub 18 and at least one rotor blade 20 that projects outwardly from the central hub 18 at locations circumferentially distributed thereabout. In the representative embodiment, the rotor 16 includes three blades 20, but the number may vary. The blades 20 are configured to interact with the passing air flow to produce lift that causes the central hub 18 to spin about a central longitudinal axis.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art.

As is well known in the industry, for certain wind turbine designs, the rotor blades 20 are coupled to the rotor hub 18 in a manner that allows the blades 20 to rotate or pitch about a longitudinal axis of the blades 20. This is achieved by coupling the root end 22 of a blade 20 to a pitch bearing (not shown) operatively coupled to the rotor hub 18. The pitch bearing generally includes a ring rotatable relative to the hub 18 to which the root end 22 of the blade 20 is coupled. Pitch bearings are generally well known in the art and thus will not be described in further detail herein.

Figure 2:
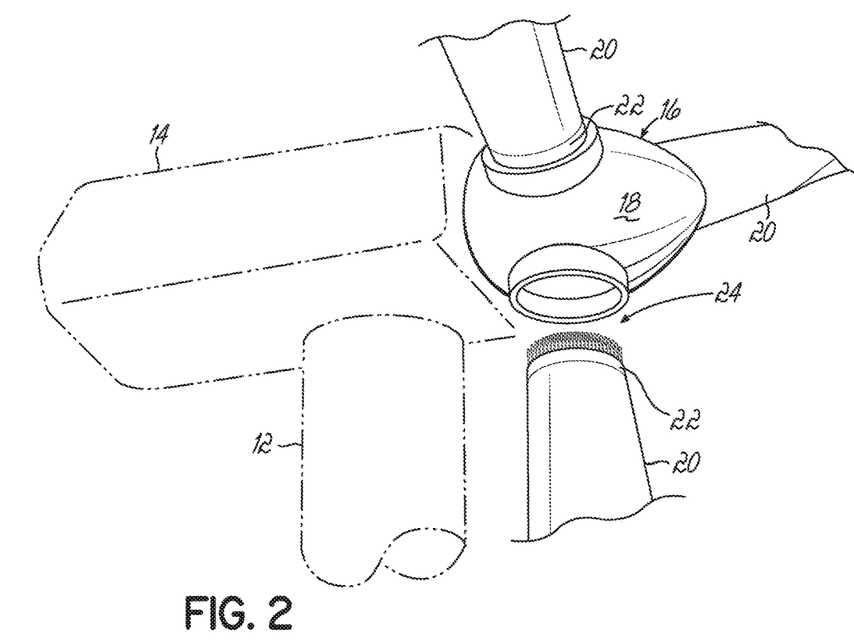
FIG. 2 is a perspective view of a connection joint between a wind turbine rotor blade and rotor hub.
Figure 3:
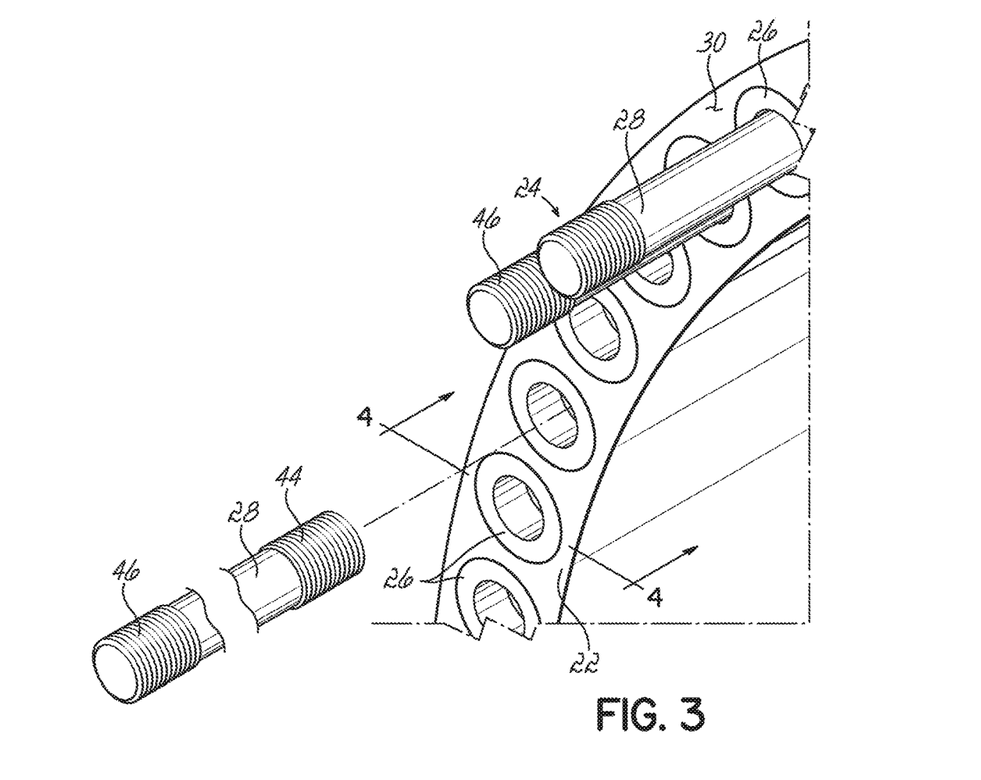
FIG. 3 is an enlarged perspective view of a root end of a wind turbine blade illustrating the connection joint.
Figure 4:
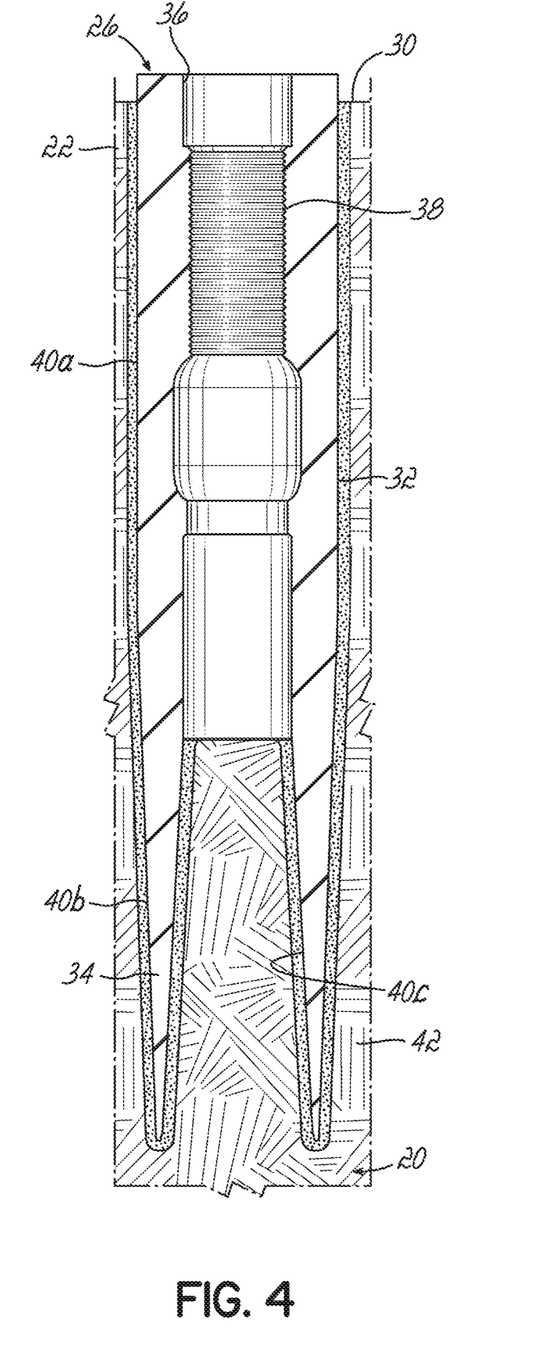
FIG. 4 is a cross-sectional view of an insert positioned in the root end of a wind turbine blade.

As illustrated in FIGS. 2 and 3, a connection joint 24 between a rotor blade 20 of the wind turbine 10 and the rotor hub 18 includes a plurality of inserts 26 coupled to the rotor blade 20 at the root end 22 thereof, and a plurality of stud bolts 28 configured to be coupled to the inserts 26 in the rotor blade 20 and further configured to be coupled to the rotor hub 18 (FIG. 3), such as through the pitch bearing. As illustrated in FIG. 3, the inserts 26 may be circumferentially spaced about an end face 30 at the root end 22 of the blade 20 and embedded within the material of the blade 20 such that a connecting end of the insert 26 slightly protrudes from the end face 30 of the blade 20 (FIG. 4). The number of inserts 26 along the circumference of the root end 22 of the blade 20 depends on the size of the blade, among potential other factors, but may be anywhere from 80 to 180 inserts for blades between 50 m-80 m in length. It should be realized that more or less inserts may be used depending on the specific application.

As illustrated in FIG. 4, the metal inserts 26 for the wind turbine blades 20 include a generally cylindrical main body 32 and a tubular extension 34 projecting from one end of the main body 32. The main body 32 includes an internal bore 36 including a threaded portion 38 for receiving and threadably coupling to a stud bolt 28. The main body 32 defines an interface 40a with the composite material 42 of the wind turbine blade 20 at the outer surface of the main body 32. The tubular extension 34 extends from the main body 32 and defines an outer interface 40b with the composite material 42 of the blade 20 at the outer surface of the tubular extension 34, and an inner interface 40c with the composite material 42 of the blade 20 at the inner surface of the tubular extension 34. As noted above, the inserts 26 are positioned within bores in the root end of the blade and bonded to the composite material using a suitable adhesive, such as an epoxy, as illustrated in FIG. 4.

The stud bolts 28 are generally cylindrical elongate members having a threaded blade end 44 and a threaded hub end 46. As illustrated in FIG. 3, during assembly of the wind turbine 10, the stud bolts 28 are threadably engaged with the inserts 26 at the root end 22 of the wind turbine blade 20 such that the threaded hub end 46 of the stud bolts 28 extends away from the root end 22 of the blade 10. The stud bolts 28 are then aligned with corresponding holes in the pitch bearing on the hub 18, inserted therethrough, and secured to the pitch bearing via a threaded fastener or the like. Through the connection joint 24, a wind turbine blade 20 may be securely coupled to the rotor hub 18 of the wind turbine 10 and generally accommodates the loads applied to the blades 20 during the operational life of the wind turbine 10.

Figure 5:
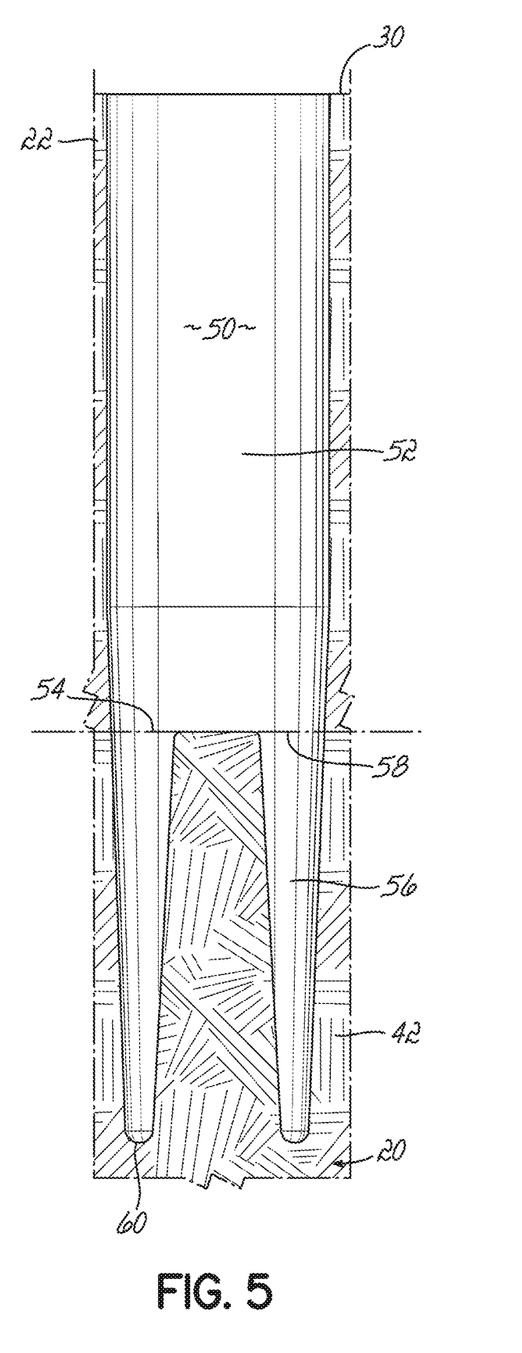
FIG. 5 is a cross-sectional view of a bore in the root end of the wind turbine blade that receives the insert.

As discussed above, the plurality of inserts 26 are circumferentially spaced about the end face 30 at the root end 22 of the rotor blade 20 and embedded in the composite material 42 that forms the root end 22 of the blade 20 (FIG. 4). Thus, after the wind turbine blade 20, or at least the root end 22 thereof, is formed, a plurality of circumferentially spaced bores 50 may be formed in the end face 30 of the root end 22 of the blade 20, as illustrated in FIG. 5. The bores 50 are generally configured to correspond in size and shape to the size and shape of the inserts 26 so that the inserts 26 may be received therein as described above. In this regard, in an exemplary embodiment each bore 50 may include a first generally cylindrical cavity portion 52 that extends inwardly from the end face 30 and terminates at a second end 54. The width (e.g., cross dimension, diameter, etc.) of the bore 50 is just slightly larger than the inserts 26 configured to be received within the bores 50. Moreover, the length of the first cavity portion 52 is configured to generally correspond to the length of the main body 32 of the insert 26.

The bore 50 further includes a second annular cavity 56 having a first end 58 at the second end 54 of the first cavity portion 52 and extending inwardly therefrom and terminating at a second end 60. In this way, the second annular cavity 56 is open to the first cavity portion 52. The configuration of the annular cavity 56 generally corresponds to the configuration of the tubular extension 34. Thus, in an exemplary embodiment, the annular cavity 56 may have a generally cylindrical configuration or a generally conical configuration (e.g., a 5° taper) to match that of the tubular extension 34. Furthermore, the length of the annular cavity 56 generally corresponds to the length of the tubular extension 34. As can be appreciated, the first annular cavity 56 should be slightly larger than the first tubular extension 34 and slightly longer than the first tubular extension so as to accommodate the first tubular extension and surrounding adhesive.

Figures 6, 6A:
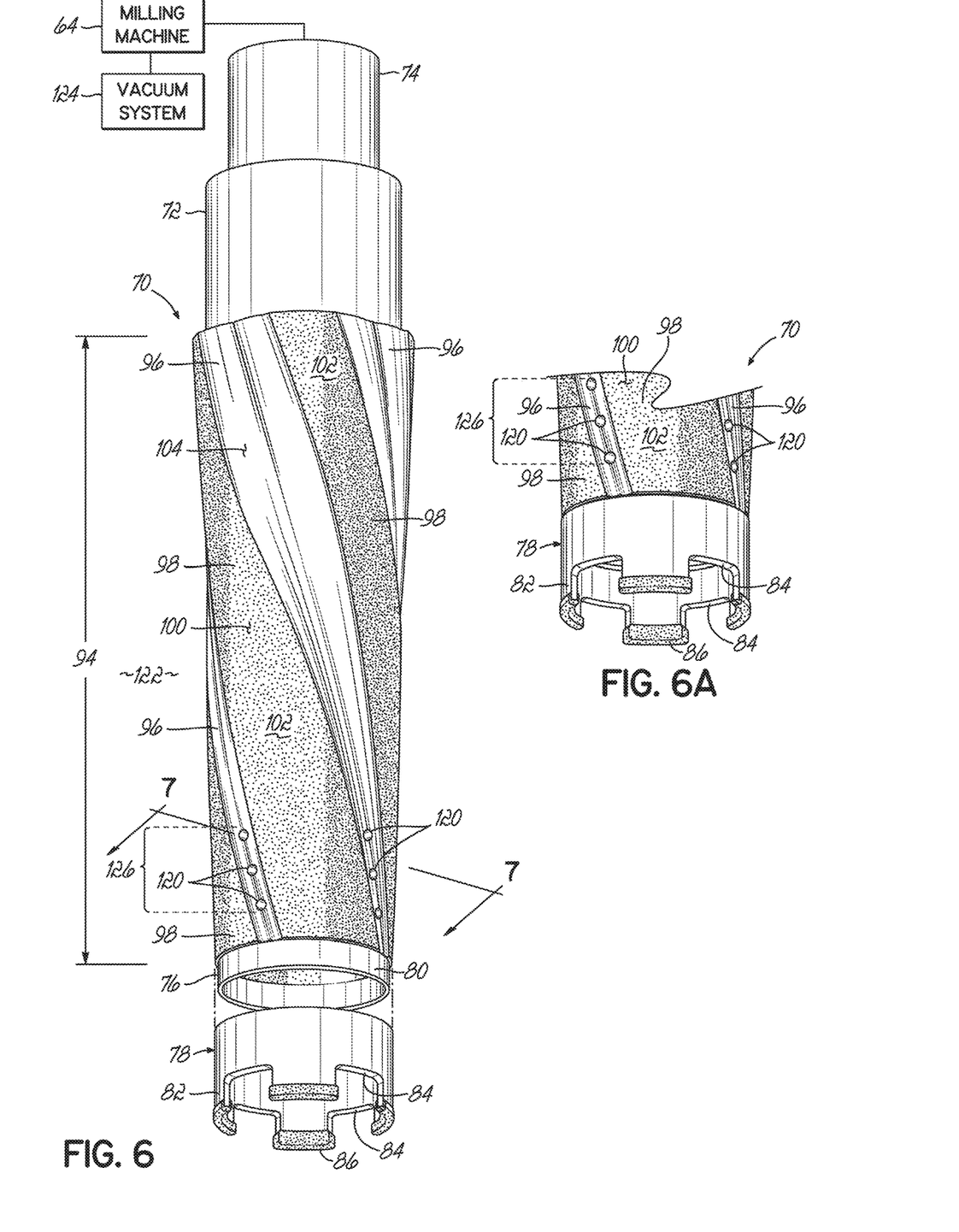
FIG. 6 is a disassembled perspective view of a mill bit in accordance with an embodiment of the invention for forming the bore in the wind turbine blade.
FIG. 6A is a partial perspective assembled view of the mill bit shown in FIG. 6.

In one embodiment, the bores 50 may be formed by a milling process using a milling machine, schematically shown at 64, and one or more mill bits operatively coupled to the milling machine 64 (FIG. 6). Milling machines 64 used for making bores in the root end of wind turbine blades are generally well known in the industry and will not be further described herein. When forming bores 50, one or more mill bits may be used to form the first cavity portion 52 and the annular cavity 56. As noted above, one of the final steps in formation of the bores 50 is to finalize the bore profile and activate the surfaces of the bores 50 using a finishing mill bit. FIG. 6 illustrates an exemplary embodiment of a finishing mill bit 70 in accordance with aspects of the present invention.

As will be described in more detail below, finishing mill bit 70 overcomes many of the drawbacks of convention finishing mill bits so that the operating life of the mill bit may be extended, and the costs associated with the manufacture of wind turbine blades may be reduced. To this end, the finishing mill bit 70 includes one or more features that enhance cooling of the mill bit such that the temperature of the mill bit during operation is reduced. More particularly, the finishing mill bit 70 includes one or more features that keep the temperature of the mill bit 70 below a threshold operating temperature that prevents the resin particles in the milled composite powder from reactivating and sticking to the mill bit. By way of example and without limitation, the finishing mill bit 70 may be configured to have an operating temperature below about 120° F. (49° C.). Below this threshold temperature the resin particles will not generally reactivate and start sticking to the mill bit. In this way, air and the milled composite powder move more easily over the outer and inner surfaces of the mill bit, and out of the mill bit under vacuum pressure. In other words, a buildup of milled composite powder on the surfaces of the mill bit 70 is prevented or significantly reduced such that the operating temperature is reduced and the operating life of the mill bit is extended. A description of a mill bit 70 in accordance with embodiments of the invention now follows.

Mill bit 70 includes a generally elongate cylindrical base body 72 having a first proximal end 74 configured to be operatively coupled to the milling machine 64, such as via a mill chuck or the like (not shown), and a second distal end 76 configured to be removably and selectively coupled to a milling tip 78. For example, the distal end 76 may include an annular flange 80 that slidably receives the milling tip 78 in a tight friction fit manner. A terminating end 82 of the milling tip 78 may have a castellated configuration defined by a plurality of openings 84 (e.g., four openings around the circumference). The terminating end 82 may further include an abrasive coating 86 that facilitates grinding or cutting of the composite material during use. As the milling tip 78 is at the forefront of engagement with the composite material, the wear rate of the milling tip 78 may be higher than that of the remainder of the mill bit 70. Accordingly, when a milling tip 78 reaches the end of its operating life, it may be removed from the mill bit 70 and replaced with a new milling tip 78.

The cylindrical base body 72 includes an outer surface 88 and an inner surface 90 defined by an internal bore 92 that extends along at least a portion of the length between the first and second ends 74, 76. For example, the internal bore 92 may extend substantially along the entire length between the first and second ends 74, 76. At least a portion of the outer surface 88 extending from the annular flange 80 towards to first end 74 defines a cutting and/or grinding portion 94 configured to engage with the composite material that forms the root end 22 of the blade 20. In an exemplary embodiment, the cutting/grinding portion 94 may extend along a majority of the length of the base body 72. For example, the cutting/grinding portion 94 may extend between just above 50% to about 80% of the length of the base body 72. However, the invention is not so limited and other lengths may be possible and within the scope of the present invention.

The cutting/grinding portion 94 includes one or more helical flutes 96, which defines one or more cutting/grinding teeth 98, and an abrasive coating 100 on the outer surface 88. In an exemplary embodiment, for example, the mill bit 70 may include four helical flutes (and four helical teeth) extending along the cutting/grinding portion 94. However, the mill bit may include more or less flutes/teeth along its outer surface in various alternative embodiments, and the invention is not limited to any particular number of flutes/teeth. The teeth 98 are configured to engage with the composite material 42 and cut and/or grind material away from an interface, while the flutes 96 are configured to provide air flow and particle removal from the milled interface. In one embodiment, the width of the flutes 96 may be generally constant along the length of the mill bit 70. In an alternative embodiment, however, the width of the flutes 96 may vary along the length of the mill bit 70. More particularly, the width of the flutes 96 may decrease in a direction from the first end 74 toward the second end 76, and the width of the teeth 98 may correspondingly increase in that direction. Such a tapering of the flutes 96 effectively compresses the air flowing along the flutes to increase flow velocity as the air moves toward the second end 76. Other configurations of the flutes 96 and teeth 98 may, however, also be possible.

In one aspect in accordance with the invention, the abrasive coating 100 does not cover the entire surface of the cutting/grinding portion 94, but only covers a select portion of the outer surface 88 along the cutting/grinding portion 94. More particularly, in an exemplary embodiment, the helical flutes 96 may be free of the abrasive coating 100, such that only the surfaces 102 of the teeth 98 are covered by the abrasive coating 100. In one embodiment, the abrasive coating 100 may be formed from an industrial diamond coating similar to existing mill bits. In an alternative embodiment, however, the abrasive coating 100 may be provided by cubic boron nitride (CBN). In this regard, CBN may have improved grain face wear durability as compared to industrial diamonds and thus may be more desirable. Other abrasive coatings may also be possible.

The abrasive coating 100 may be applied according to known processes. In one embodiment, the abrasive coating 100 may be applied through an electroplating process using, for example, nickel (II) nitride. In this regard, a nickel layer of about 20 microns may be deposited on the selected portions of the mill bit 70. The portions of the mill bit 70 that are to be abrasive free (i.e., the helical flutes 96) may be masked during the electroplating process. Subsequently, the abrasive elements may be immersed into the nickel layer. Grain immersion may be between about 40% to 50% of the grain diameter. In this regard, the grain size (e.g., diameter) of the abrasive elements may be, for example, D426 (FEPA standard) elements (e.g., industrial diamonds or CBN elements). However, due to the lower operating temperatures afforded by aspects of the present invention, thermal expansion of the base body 72 may be decreased, and thus larger grain sizes may be used in the abrasive coating. For example, a grain size of D501 or even larger may be used in the abrasive coating 100.

In addition to omitting the application of abrasive coating 100 along the helical flutes 96, the surfaces 104 of the helical flutes 96 may be honed, buffed, polished or otherwise finished so as to be very smooth. In this regard, the surfaces 104 that form the helical flutes 96 may have a surface roughness equal to or less than about $R_a=8$ microinches ($R_a=0.2$ micrometers). By omitting the abrasive coating 100 from the helical flutes 96 and finishing the helical flutes 96 to have a very smooth topology, particle capture along the flutes 96 is reduced and air flow (i.e., increased air speed and/or air flow volume) is significantly improved. As a result, the temperature of the mill bit 70 during operation may be reduced due to improved heat transfer from the mill bit 70. The deduction in operating temperature, in turn, reduces the reactivation of the resin particles in the milled powder, and reduces clogging of the mill bit. Accordingly, the operating life of the mill bit 70 may be extended.

Figure 7:
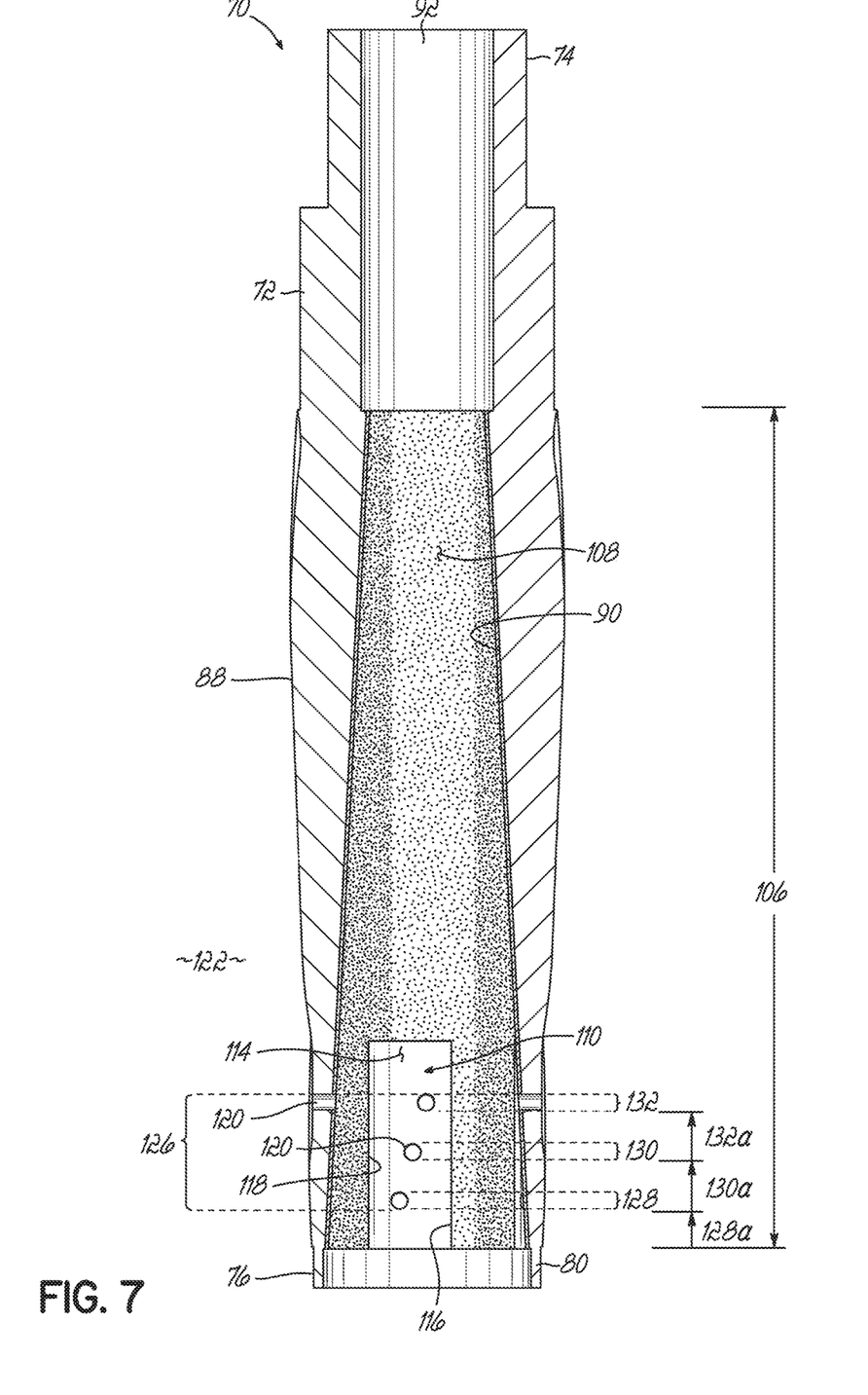
FIG. 7 is a cross-sectional view of the mill bit shown in FIG. 6.

Similar to the above and with reference to FIG. 7, in one embodiment at least a portion of the inner surface 90 extending from annular flange 80 towards the first end 74 defines a cutting/grinding portion 106 configured to engage with the composite material that makes up the root end 22 of the blade 20. In an exemplary embodiment, the cutting/grinding portion 106 may extend along a majority of the length of the base body 72. For example, the cutting/grinding portion 106 may extend between just above 50% to about 80% of the length of the base body 72. However, the invention is not so limited and other lengths may be possible and within the scope of the present invention. The lengths of the cutting/grinding portions 94, 106 on the outer and inner surfaces 88, 90, respectively, may be substantially the same or may be different from one another depending on, for example, a particular application.

In one embodiment, substantially the entire cutting/grinding portion 106 may include an abrasive coating 108. The abrasive coating 108 may be an industrial diamond coating similar to existing mill bits. In an alternative embodiment, however, the abrasive coating 108 may be provided by cubic boron nitride (CBN) similar to abrasive coating 100 on the outer surface 88 of the mill bit 70. Other coatings may also be possible. The abrasive coating 108 on the inner surface 90 may be applied by the process described above, for example.

In accordance with another aspect of the invention, the abrasive coating 108 may not cover the entire surface of the cutting/grinding portion 106, but only cover a select portion of the inner surface 90 along the cutting/grinding portion 106. More particularly, the cutting/grinding portion 106 may include a plurality of generally linear void regions or strips 110 which may be free of the abrasive coating 108. These void strips 110 effectively form a plurality of linear "flutes" along the cutting/grinding portion 106 of the inner surface 90 (i.e., extend in the longitudinal direction of the mill bit 70). In an exemplary embodiment, for example, the mill bit 70 may include four void strips 110 extending along the cutting/grinding portion 106. However, the mill bit 70 may include more or less void strips 110 along the inner surface 90 in various alternative embodiments.

The void strips 110 may extend from the annular flange 80 toward the first end 74 of the mill bit 70 for a length between about 10% and about 30% of the length of the cutting/grinding portion 106 (and/or between about 10% and about 30% of the length of the helical flutes 96). Other lengths may also be possible within the scope of the invention. In one embodiment, the width of each of the void strips 110 may be between about 15% and about 20% of the inner circumference of the mill bit 70 at the annular flange 60. In one embodiment, the width of the void strips 110 may be substantially constant along the length of the strips 110, but in an alternative embodiment may vary along their lengths, such as having a tapered or conical configuration (not shown). Additionally, and similar to the helical flutes 96, in addition to omitting the application of abrasive coating 108 along the void strips 110, the surfaces 114 of the void strips 110 may be honed, buffed, polished or otherwise finished so as to be very smooth. In this regard, the surfaces 114 that form the void strips may have a surface roughness equal to or less than about $R_a=8$ microinches ($R_a=0.2$ micrometers).

The inclusion of the void strips 110 (or linear flutes) provides a relief along the inner surface 90 that allows for improved air flow and particle evacuation in the mill bit 70. As a result, the temperature of the mill bit 70 during operation may be reduced. The reduction in operating temperature, in turn, reduces the reactivation of the resin particles in the milled powder, and reduces clogging of the mill bit. Accordingly, the operating life of the mill bit 70 may be extended. Additionally, and in another advantageous aspect, the linear flutes 110 define a leading edge 116 and a trailing edge 118 at the junction between the abrasive coating 108 and the void strip 110. The leading edge 116 provides an abrupt cutting face at the interior of the mill bit 70 that more efficiently removes material through a cutting action as opposed to a grinding action. The removal of material through a cutting action produces less heat compared to grinding, resulting in lower operating temperatures. It should be understood that the linear flutes 110 on the interior surface 90 may be used alone or in combination with the abrasive-free flutes 96 on the outer surface 88 as described above.

In another aspect in accordance with the invention, the mill bit 70 may include one or more porting bores 120 that extend through the sidewall of the mill bit 70 so as to fluidly connect the external environment 122 of the mill bit 70 and the internal bore 92. For example, the porting bores 120 may between the outer surface 88 and the inner surface 90. Should the porting bores be located in positions that include one or both of the abrasive coatings 100, 108, then the porting bores 120 would also extend through these coatings as well. The porting bores 120 are configured to establish an air flow between the external environment 122 of the mill bit 70 to the inside of the mill bit 70. The air flow may be generated, for example, at least in part by a vacuum system 124 operatively coupled to the internal bore 92 of the mill bit 70, similar to existing systems (FIG. 6). The vacuum system 124 may be part of the milling machine 64 or a separate system. In any event, the vacuum system 124 is configured to pull a vacuum within the internal bore 92 of the mill bit 70 and thereby create an air flow through the porting bores 120. In an exemplary embodiment, the porting bores 120 may have a diameter between about 1 mm and about 5 mm. For example, the porting bores 120 may have a diameter of about 3 mm. The size of each of the porting bores 120 may be substantially the same or the size of the porting bores 120 may have varying sizes. In one embodiment, the total cross-sectional area of the plurality of the porting bores 120 may be between about 10% and about 20% of the cross-sectional area of the internal bore 92 at the proximal end 74 (i.e., the discharge port area). More preferably, the total cross-sectional area of the plurality of the porting bores 120 may be about 15% of the cross-sectional area of the internal bore 92 at the proximal end 74.

In an exemplary embodiment, the mill bit 70 includes a plurality of porting bores 120. By way of example, in one embodiment a plurality of porting bores 120 may distributed circumferentially about the mill bit 70 at, for example, substantially the same longitudinal distance from the second end 76 of the mill bit 70. In an alternative embodiment, a plurality of porting bores 120 may be distributed longitudinally along the mill bit 70 at, for example, substantially the same circumferential position (e.g., longitudinally aligned). In a preferred embodiment, however, a plurality of porting bores 120 may be distributed both circumferentially and longitudinally about the mill bit 70. The arrangement of porting bores 120 may have a regular pattern or an irregular pattern in various embodiments.

By way of example, in an exemplary embodiment, a pattern 126 of porting bores 120 may include a first ring 128 of bores 120 circumferentially distributed at a first longitudinal distance 128a from the second end 76 of the mill bit 70; a second ring 130 of bores 120 circumferentially distributed at a second longitudinal distance 130a from the second end 76 of the mill bit 70; and a third ring 132 of bores 120 circumferentially distributed at a third longitudinal distance 132a from the second end of the mill bit 70. While three rings 128, 130, 132 are described, it should be recognized that the pattern 126 may include additional/fewer rings. Each ring 128, 130, 132 may include the same number of bores 120 or different number of bores. For example, each ring 128, 130, 132 may include the same number of bores 120, and that number may coincide with the number of flutes 96 on the mill bit 70 (e.g., four porting bores 120 per ring). The longitudinal spacing between adjacent rings 128, 130, 132 may be substantially constant in one embodiment (i.e., rings 128, 130, 132 may be equally spaced longitudinally). For example, the rings 128, 130, 132 may be longitudinally spaced between about 5 mm and about 15 mm apart. Preferably, the rings 128, 130, 132 may be spaced about 10 mm apart. Additionally, the porting bores 120 may start in a region between about 10 mm to about 30 mm from the second end 76 of the mill bit 70. The porting bores 120 in the rings 128, 130, 132 may be longitudinally aligned in one embodiment. In an exemplary embodiment, however, the porting bores 120 in adjacent rings 128, 130, 132 may be circumferentially offset from one another such that the porting bores 120 of the rings are not longitudinally aligned. This is best illustrated in FIG. 7.

In an exemplary embodiment and as illustrated in FIG. 6, each of the plurality of porting bores 120 may be open to one of the flutes 96 on the outer surface 88 of the mill bit 70. In this way, the faster moving air flowing along the flutes 96 may access the porting bores 120 and inject high velocity air into the internal bore 92. In addition, each of the porting bores 120 may be open to one of the linear flutes or void strips 110 on the inner surface 90 of the mill bit 70. This is best illustrated in FIG. 7. By locating the porting bores 120 in the helical flutes 96 and/or the linear flutes 110, particle movement and airflow may be significantly improved.

The pattern of porting bores 120 in the mill bit 70 is configured to generate an air flow within the mill bit 70 that enhances heat transfer away from the mill bit 70 in order to reduce the operating temperature of the bit. In this regard, the pattern of porting bores 120 may be particularly configured to induce vortices within the interior of the mill bit 70. By organizing the flow pattern within the internal bore 92, the air flow velocity and volume throughput may be significantly increased as compared to convention designs. In the three-ring pattern described above, the first, lowermost ring (e.g., closest to the distal end 76) may be configured as the primary vortex inducer. The second and third rings may be configured as charger ports that increase the terminal air flow and further organize the fluid moving through the internal bore 92. By inducing internal vortex generation, it is believed that the volumetric air flow may be increased between about 200-500 m$^3$/min, which represents about a 35% increase in the volumetric air flow through the mill bit 70 as compared to a conventional design.

It should be recognized that the porting bores 120 may be used alone or in combination with one or more of the other features described above to reduce the operating temperature of the mill bit 70, and thereby extend its operating life. For example, in an exemplary embodiment, a finishing mill bit includes the smooth helical flutes 96 on the outer surface 88, the linear flutes 110 on the inner surface 90, and the porting bores 120. Alternate embodiments, however, may include any one or various combinations of these features and remain within the scope of the present invention. It is believed that by incorporating one or more of these features, the operating life of a mill bit may be significantly extended. By way of example, it is believed that a mill bit that incorporates all of the features described above may have an operating life of well over 2,000 bores, which represents an improvement of over 1400%. Due to reduced operating temperatures, which may be just slightly higher than ambient temperature (and well under a threshold temperature of about 120° F. (49° C.)), fewer mill bits will have to be provided for wind turbine blade manufacturing. Accordingly, the costs for wind turbine manufacturing may be reduced.

In a further aspect of the present invention, at least a portion of the mill bit 70 may be recyclable. In this regard, after a mill bit 70 has been worn and rendered unusable, what remains of the abrasive coatings 100, 108 may be removed from the underlying base body 72. For example, the worn mill bit may first be blasted using, for example, glass bead media (i.e., glass bead blasting). Once the mill bit 70 has been blasted, the mill bit may be subjected to chemical stripping or debriding. In this process, the desired parts of the mill bit are dipped or otherwise subjected to a suitable stripping agent that dissolves the abrasive coating on the base body 72. For example, acidic immersion stripping, alkaline cyanide immersion tripping, and electrolytic stripping may all be used to remove the abrasive coatings from the base body 72. Once the abrasive coatings have been removed from the base body 72, the base body 72 may be cleaned and prepared for another abrasive coating on the outside and/or inside of the base body 72. For example, the electroplating process described above may be used to apply a new abrasive coating to select portions of the outer surface 88 and/or select portions of the inner surface 90.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. For example, while the mill bit described herein was directed to the formation of bores in the root end of the blade for receiving inserts for the connection joint to the rotor hub, the mill bit may be used to form bores in other portions of the wind turbine blade. Thus, the various features of the invention may be used alone or in any combination depending on the needs and preferences of the user.

What is claimed is:

1. A mill bit for the manufacture of a wind turbine blade, comprising:
    a tubular elongate base body having a proximal end, a distal end, an outer surface, and an internal bore that defines an inner surface, wherein the internal bore is open at the distal end;
    one or more flutes formed on the outer surface that defines one or more teeth; and
    an abrasive coating on at least a portion of the outer surface, wherein the one or more flutes are free of the abrasive coating, wherein the abrasive coating is configured for grinding or cutting,
    wherein the inner surface also includes the abrasive coating.

2. The mill bit according to claim 1, wherein the one or more flutes has a surface roughness less than or equal to about $R_a$=8 microinches (0.2 micrometers).

3. The mill bit according to claim 1, wherein the grain size in the abrasive coating is about D501 or greater, preferably wherein the abrasive coating includes industrial diamonds or cubic boron nitride (CBN).

4. The mill bit according to claim 1, wherein the one or more flutes are helical flutes.

5. The mill bit according to claim 1, wherein the inner surface defines one or more void strips that are free of the abrasive coating to define one or more flutes on the inner surface, and wherein said one or more void strips has a surface roughness less than or equal to about $R_a$=8 microinches (0.2 micrometers).

6. The mill bit according to claim 5, wherein an interface between the abrasive coating and the one or more void strips defines a cutting edge.

7. The mill bit according to claim 5, wherein the one or more void strips define one or more linear flutes on the inner surface.

8. The mill bit according to claim 1, further comprising one or more porting bores extending through a wall of the base body to fluidly connect an external environment with the internal bore.

9. The mill bit according to claim 8, wherein there are a plurality of porting bores, and the porting bores are longitudinally and/or circumferentially spaced from one another.

10. The mill bit according to claim 9, wherein the plurality of bores includes a first ring of circumferentially spaced porting bores, a second ring of circumferentially spaced porting bores, and a third ring of circumferentially spaced porting bores, wherein the first, second and third rings are longitudinally spaced from one another.

11. The mill bit according to claim 10, wherein the number of porting bores in each of the first, second and third rings corresponds to the number of flutes on the outer surface.

12. The mill bit according to claim 8, wherein each of the one or more porting bores is open to a flute on the outer surface.

13. The mill bit according to claim 12, wherein each of the one or more porting bores is open to a void strip on the inner surface.

14. A mill bit for the manufacture of a wind turbine blade, comprising:
    an elongate base body having a proximal end, a distal end, an outer surface, and an internal bore that defines an inner surface;
    one or more flutes formed on the outer surface that defines one or more teeth; and
    an abrasive coating on at least a portion of the outer surface, wherein the one or more flutes are free of the abrasive coating,
    wherein the inner surface includes an abrasive coating and wherein the inner surface defines one or more void strips that are free of the abrasive coating to define one or more flutes on the inner surface.

* * * * *